United States Patent [19]

Carmelite et al.

[11] Patent Number: 4,774,035

[45] Date of Patent: Sep. 27, 1988

[54] PROCESS OF COATING AN OPHTHALMIC LENS

[75] Inventors: Donald D. Carmelite, Coral Springs, Fla.; Timothy J. Smith, St. Cloud, Minn.; Joseph L. Peralta, Hollywood, Fla.

[73] Assignee: Camelot Industries Corporation, St. Paul, Minn.

[21] Appl. No.: 122,540

[22] Filed: Nov. 13, 1987

Related U.S. Application Data

[63] Continuation of Ser. No. 818,728, Jan. 14, 1986, abandoned.

[51] Int. Cl.$^4$ .............................................. B29D 11/00
[52] U.S. Cl. .................................. 264/1.4; 264/1.7; 427/54.1; 427/164
[58] Field of Search ............... 264/1.4, 1.7, 1.8, 1.9, 264/22; 523/106, 107, 937; 427/164, 54.1

[56] References Cited

U.S. PATENT DOCUMENTS

| | | | |
|---|---|---|---|
| 2,479,935 | 8/1949 | Johnson | 18/59 |
| 3,955,035 | 5/1976 | Ito et al. | |
| 3,968,305 | 7/1976 | Oshima et al. | 427/164 |
| 4,073,967 | 2/1978 | Sandvig | 427/44 |
| 4,084,021 | 4/1978 | Sandvig | 427/44 |
| 4,199,421 | 4/1980 | Kamada et al. | 205/159.22 |
| 4,262,072 | 4/1981 | Wendling et al. | 430/14 |
| 4,273,799 | 6/1981 | Kamada et al. | 427/44 |
| 4,273,802 | 6/1981 | Kamada et al. | 427/164 |
| 4,291,097 | 9/1981 | Kamada et al. | 427/164 |
| 4,306,954 | 12/1981 | Wendling et al. | 204/159.22 |
| 4,308,119 | 12/1981 | Russell | 204/159.12 |
| 4,323,591 | 4/1982 | Wendling et al. | 427/53.1 |
| 4,338,269 | 7/1982 | Russell | 264/22 |
| 4,338,375 | 7/1982 | Hashimoto et al. | 427/164 |
| 4,339,474 | 7/1982 | Kishida et al. | 427/54.1 |
| 4,351,881 | 9/1982 | Kamada et al. | 428/412 |
| 4,367,245 | 1/1983 | Kishida et al. | 427/54.1 |
| 4,371,566 | 2/1983 | Russell | 427/53.1 |
| 4,373,007 | 2/1983 | Russell | 428/412 |
| 4,382,983 | 5/1983 | Yuyama et al. | 427/164 |
| 4,388,345 | 6/1983 | Kishida et al. | 427/54.1 |
| 4,399,192 | 8/1983 | Russell | 428/412 |
| 4,407,855 | 10/1983 | Russell | 427/54.1 |
| 4,438,062 | 3/1984 | Griffith et al. | 264/255 |
| 4,443,177 | 4/1984 | Modur et al. | 425/543 |
| 4,477,405 | 10/1984 | Makhlouf et al. | 264/250 |
| 4,479,644 | 10/1984 | Bartimes | 271/107 |
| 4,479,770 | 10/1984 | Slat et al. | 425/503 |
| 4,479,771 | 10/1984 | Slat et al. | 425/503 |
| 4,497,763 | 2/1985 | Monnet | 264/255 |
| 4,498,854 | 2/1985 | Ross | 425/116 |
| 4,499,235 | 5/1985 | Ungar et al. | 428/148 |
| 4,508,785 | 4/1985 | Cobbledick | 428/424.4 |
| 4,515,543 | 5/1985 | Hamner | 425/112 |
| 4,515,710 | 5/1985 | Cobbledick et al. | 252/511 |
| 4,517,235 | 2/1985 | Verwer et al. | 525/38 |
| 4,520,062 | 5/1985 | Ungar et al. | 428/148 |
| 4,544,572 | 10/1985 | Sandrig et al. | 427/164 |

FOREIGN PATENT DOCUMENTS

| | | | |
|---|---|---|---|
| 1174798 | 9/1984 | Canada | 402/451 |
| 1198259 | 7/1970 | United Kingdom . | |
| 1338150 | 11/1973 | United Kingdom . | |

*Primary Examiner*—James Lowe
*Attorney, Agent, or Firm*—Kinney & Lange

[57] ABSTRACT

An abrasion-resistant coated plastic lens element and a method for coating the element with an abrasion-resistant coating includes forming a coating on a face of a mold that is substantially cured and adherable to lens-forming material. The coating composition consists of reactants, approximately 70% to 95% of which have at least triacrylate functionality and approximately 5% to 30% of which have diacrylate functionality, a photoinitiator, a polymerization inhibitor reactive with oxygen, and a silane adhesion promoter and an acid to activate the silane adhesion promoter. The coating is applied to the face of the mold to form a substantially uniform coating and is then subjected to ultraviolet light in an ambient oxygen-containing environment such that a hard abrasion-resistant coating is formed on the mold. The mold is then filled with a lens-forming composition which is reactive with acrylate groups of the coating at a coating/lens interface. The lens-forming composition is permitted to cure in the mold to form a lens having a hard abrasion-resistant coating. No further post curing treatment is required since the lens leaves the mold at its maximum cure, hardness, and abrasion resistance.

17 Claims, No Drawings

PROCESS OF COATING AN OPHTHALMIC LENS

This is a continuation of application Ser. No. 818,728, filed on Jan. 14, 1986, now abandoned.

BACKGROUND OF THE INVENTION

1. Field of the Invention

The present invention relates to coated ophthalmic lenses and to the method of applying a coating to such lenses, and in particular, it relates to applying a thin abrasion-resistant coating to form a coated ophthalmic lens.

2. Description of the Prior Art

Optically clear, polymerizable, cast or molded plastics having a high light transmission and low haze are increasingly preferred over glass for ophthalmic lens material due to lighter weight, higher impact resistance and breakage resistance, as well as lower manufacturing costs in high-volume applications. Optical elements and lenses of uncoated plastics, however, suffer by comparison to glass from poor resistance to abrasion, scratching and marring which results in surface haze and poor image quality as well as low resistance to some common chemicals and solvents. Numerous commercial products have been introduced which have a hard coating to protect the plastic lens.

Conventional methods of applying such hard coating compositions employ flow coating, dipping, spraying, spin coating, curtain coating, and various other methods. All of these methods apply the coating to a previously formed or shaped, molded or cast plastic optical element or lens. However, certain advantages exist for applying the hard coating composition into the mold before casting or molding takes place, then partially or fully polymerizing the coating with the coating adhering to the molded plastic optical element at the time of removal from the mold. Examples of in-mold coating processes for forming labels on plastic containers are described in the following patents:

| Inventor | Patent No. |
|---|---|
| Ross | 4,498,854 |
| Bartimes et al | 4,479,644 |
| Slat et al | 4,479,770 |
| Slat et al | 4,479,771 |

Examples of in-mold processes which provide a decorative or protective coating on nonoptical thermoset molded plastics or plastic parts are described in the following patents:

| Inventor | Patent No. |
|---|---|
| Verwer et al | 4,517,235 |
| Ungar et al | 4,520,062 |
| Makhlouf et al | 4,477,405 |
| Modur et al | 4,443,177 |
| Ungar et al | 4,499,235 |
| Monnet | 4,497,763 |
| Griffith et al | 4,438,062 |
| Hamner | 4,515,543 |
| Cobbledick | 4,515,710 |
| Cobbledick et al | 4,508,785 |

Hard coating of polymethyl methacrylate (PMMA) cell-cast acrylic sheet windows is described in Japanese Pat. No. 74-45965 issued on May 2, 1974 to Oshima et al. The coating is applied in-mold and is subjected to a plurality of exposures to actinic or ultraviolet radiation before filling the mold with a suitable polymerizable resin. The coating is cured in situ with the acrylic sheet. One drawback to this process is that the freshly coated mold is blanketed with an inert gas atmosphere before exposing the ultraviolet-curable coating composition to an ultraviolet radiation source.

The Oshima et al U.S. Pat. No. 3,968,305 also describes providing a protective coating layer to acrylic sheet windows. Preferred coating compositions include trimethylolethane triacrylate, trimethylolpropane triacrylate, pentaerythritol tetracrylate. The coating is polymerized preferably by ultraviolet rays with the polymerization carried out in noncontact with oxygen. A photosensitizer is used, capable of activating the polymerizable coating material at a wavelength ranging from 3000 to 4000 A, to produce a radical with a preferred photosensitizer being a carbonyl compound. After the coating composition is placed on the mold surface, a film having little or no affinity for the coating composition is made to adhere closely to the coating composition to ensure that no air bubbles are left thereby preventing the coating composition from coming into contact with oxygen. After the coating composition is cured to the degree desired, the film is removed and monomer for the formation of the polymeric body of the article is disposed on the coated cured composition. Although the coating material is polymerized to a great degree, there is adhesion of the surface layer to the resin forming the shaped article.

The Matsuo et al U.S. Pat. No. 3,968,309 describes a process for applying an abrasion resistant coating on a substrate of plastic. The coating consists of at least 30% by weight of polyfunctional compounds selected from the group consisting of polymethacryloyloxy compounds having at least three methacryloyloxy groups in one molecule with the molecules having a molecular weight of 250 to 800 and polyacryloyloxy compounds having at least 3 acryloyloxy groups in each molecule, and a fluorine-containing surfactant, in which the fluorine atom is bonded to a carbon atom. The coating is either applied to the already molded plastic substrate or is applied to the mold and the coating is cured by ultraviolet radiation in a nitrogen atmosphere.

The Russell U.S. Pat. No. 4,338,269 discloses an in-mold applied hard coating composition for the formation of a coated ophthalmic lens. The coating composition includes a pentaerythritol-based polyacrylate in combination with a cellulose ester or vinyl chloride-vinyl-acetate-containing copolymer (the function of which is to reduce surface oxygen inhibition during cure) followed by ultraviolet actinic radiation to form a cured abrasion-resistant coating in the presence of an ordinary oxygen-containing atmosphere. However, in order to obtain a satisfactory degree of crosslinking in the presence of ultraviolet radiation in an ordinary oxygen-containing environment, the Russell compositions contain a cellulose ester or a vinyl chloride-vinyl acetate containing copolymer in substantial proportion (on the order of 10% or more). Consequently, the Russell coating does not achieve the abrasion resistance that is presently desirable for ophthalmic lenses.

The Sandvig et al U.S. Pat. No. 4,544,572 describes an in-mold hard coated plastic ophthalmic lens which employs an ethylenically-reactive-unsaturated monomer/oligomer-containing formulation which is applied to a mold surface. Solvents in the formulation are volatilized and the formulation is brought to an intermediate degree of crosslinking by either heat or actinic radiation to form a dry tack-free film having sufficient adhesion and cohesive strength to the mold surface to permit further processing and to precisely replicate the mold surface so as to be free of optical defects. The coating at this point is in a soft-nonabrasion-resistant "gelled" polymer state. The lens forming material is then introduced into the mold and the lens forming material along with the coating composition is then subsequently crosslinked or hardened by heat. The lens is removed with the coating adhering to the fully polymerized plastic lens, both being in a fully cured state.

SUMMARY OF THE INVENTION

The present invention includes an abrasion-resistant coated plastic lens element and a method for coating the element with an abrasion-resistant coating. The method includes forming a coating on a face of a mold that is substantially cured and capable of being adhered to a lens-forming material. The coating composition consists of reactants, approximately 70% to 95% of which have at least triacrylate functionality and approximately 5% to 30% of which have diacrylate functionality, a photo-initiator, a polymerization inhibitor reactive with oxygen, a silane adhesion promoter and an acid to activate the adhesion promoter. The coating is applied to the face of the mold and forms a substantially uniform coating and is then subjected to ultraviolet light in an oxygen-containing environment such that a hard abrasion-resistant coating is formed on the mold. The mold is then filled with a lens-forming composition which is reactive with acrylate groups of the coating at a coating/lens interface. The lens-forming composition is permitted to cure in the mold to form a lens having a hard abrasion-resistant coating. No further post curing treatment is needed since the coating is at maximum abrasion resistance when the lens leaves the mold.

DETAILED DESCRIPTION OF THE PREFERRED EMBODIMENTS

The present invention includes a process for producing an ophthalmic lens having an abrasion resistant coating in situ. For purposes of the present application, "abrasion resistant coating" is defined as a coating providing a greater resistance to abrasion than the plastic lens element. The coating is applied to a mold surface and substantially cured to an abrasion resistant state under ambient conditions in an oxygen environment using ultraviolet radiation. Material to form the lens is then introduced into the mold and cured to a hard state with the coating adhering to the lens material.

The molds used to form the coated lens of the present invention are well known in the art. The molds have first and second mold sections that form front and back optical surfaces of the lens. The first and second mold sections are held together by a gasket to form a mold cavity. At least one of these mold sections has a surface that forms a finished optical surface.

The coating composition of the present invention is applied to at least one of the mold surfaces by any one of a variety of techniques that includes spraying, dipping, brushing, flow coating, spin coating and the like. A preferred method of applying the coating is flow coating wherein the coating is applied by flowing the coating composition onto a face of a mold while moving a flow nozzle in a semi-circular path and allowing the coating to flow along the face of the mold to form a uniform thin film.

For purposes of the present application, the term prepolymer means monomer, oligomer and other reactants which react to form a polymeric material.

The coating composition of the present invention primarily consists of reactants of which approximately 70% to 95% have at least triacrylate functionality and approximately 5% to 30% of which have at least diacrylate functionality. It has been found that such a composition renders excellent levels of abrasion resistance and surface hardness once cured while providing a uniform excellent adhering coating on single vision lenses and multi-focal lenses.

Prior to the present invention, defects resulted in applying a cured abrasion-resistant coating to a lens-forming material to produce an abrasion-resistant lens. The defects have been encountered in both single focal lenses but especially in multi-focal lenses. Multi-focal lenses present an added difficulty since the contour of the lens changes dramatically between the portions of the lens that provide different focal lengths.

One defect which will be referred to as "angel hair" exhibits itself as a fine line or lines between the coating and the lens material. This type of defect renders an ophthalmic lens unsatisfactory. It has been found by the applicants that this defect is caused by the coating delaminating from the mold and portions of the coating coiling up, permitting the lens material to flow in the area left by the delaminated material. This defect is characteristic of both single vision and multi-focal lenses. Angel hair is apparent in both non-dyed and dyed lenses.

Another defect of previously-used coatings is characteristic of multi-focal lenses. The line along which the curvature of the lens changes to define one focal area from another of a multi-focal lens is typically called a "seg line." Previously used coatings have delaminated along this seg line. The coating tends to crack at the seg line and rolls up and pulls away from the mold surface along the "seg line" during the formation of the lens material, permitting the lens material to flow between the coating and the face of the mold. If the lens is tinted, a visible defect occurs since the absorption of a dye by the coating material and the lens material is different. If the lens is not tinted, the defect is only noticeable through microscopic examination, which is difficult and expensive.

Another defect that previous coatings have exhibited has been termed as "cracked lenses." This defect is characterized by circular cracks in the coating of the finished lens.

Still another defect called "cast open" is a defect which has been caused by the coated lens separating from the face of the glass mold prematurely, resulting in lenses having pre-release flow marks and/or off-curved lenses.

Still another defect which is referred to as "undercoat" is a subtle defect in which the coating is too thin and therefore too porous in certain sections of the coating. This defect is generally found in multi-focal lenses and permits dye that is used to tint the lens to penetrate the coating at the "seg line" of the multi-focal lens even though that section of the lens is coated. It is believed that previous coatings resulted in poor adhesion to mold surface and/or brittle cure coatings which, when cured, shrink and form cracked delaminated coatings.

The coating composition of the present invention eliminates the above defects sufficiently such that production of coated lenses, both single and multi-focal lenses, provide satisfactory yields on the order of 80% or more. That is, 80% of the lenses produced do not contain the above defects.

The primary coating composition of the present invention consists of reactants having at least a triacrylate functionality. In other words, the primary coating reactant includes predominantly monomers or oligomers having at least 3 or more acrylate-functional groups per molecule. A preferred primary component having at least triacrylate functionality includes monomer or oligomer constituents that form pentaerythritol tetraacrylate (PETA), dipentaerythritol monohydroxy pentaacrylate (DPMHPA), trimethylolpropane trimethylacrylate (TMPTA), pentaerythritol triacrylate, blends or oligomers thereof, as well as other prepolymers having at least triacrylate functionality.

A preferred primary reactant of the coating composition of the present invention includes pentaerythritol triacrylate, sold under the designation of SR-444 by Sartomer Corporation of Westchester, Pa.

The secondary reactant used in the coating composition of the present invention has a diacrylate functionality. A preferred component is polyethylene glycol diacrylate. However, other compositions having a diacrylate or a dimethacrylate functionality and exhibiting the properties of polyethylene glycol diacrylate are includable within the present invention. A suitable polyethylene glycol diacrylate is sold under the designation SR-344 by Sartomer Corporation of Westchester, Pa. Other diacrylates and dimethylacrylates includable within the present invention include ethylene glycol di(meth)-acrylate, 1,3-propylene glycol di(meth)acrylate, 1,4-butanediol di(meth)acrylate, 1,6-hexanediol di(meth)acrylate, diethylene glycol di(meth)acrylate, triethylene glycol di(meth)acrylate, tetraethylene glycol di(meth)acrylate, neopentyl glycol di(meth)-acrylate, 2,2 bis-(4-acryloxyethoxyphenyl)propane, 2,2 bis-(4-methacrloxyphenyl)propane, 2,2 bis-(4-acryloxyethoxyphenyl)propane, 2,2 bis-(4-methacryloxyethoxyphenyl)propane, 2,2 bis-(4-acryloxydiethoxyphenyl)propane, 2,2 bis-(4-methacryloxydiethoxyphenyl)propane, 2,2 bis-(4-acryloxypropoxyphenyl)propane, 2,2 bis-(4-methacryloxypropoxyphenyl)propane, 2,2 bis-(4-acryloxy-(2-hydroxypropoxy)phenyl)propane, 2,2 bis-(4-methacryloxy(2-hydroxypropoxy)phenyl)propane, 2,2 bis-(4-acryloxy-(2-hydroxypropoxyethoxy)phenyl)propane, 2,2, bis-(4-methacryloxy-(2-hydroxypropoxyethoxy)-phenyl)propane, etc.

It has been found by applicants that previous coatings made from a high amount of purely tetraacrylate or better functional reactants provided a coating although hard, but which exhibited a great amount of defects in finished lenses, especially multifocal lenses. In adding a diacrylate reactant, the coating became slightly more flexible while still retaining excellent hardness and abrasion resistance. It has been found by applicants that 5 to 20 parts of the diacrylate reactant with 80 to 95 parts of the primary reactant provides a coating composition that significantly reduces the defects discussed previously. Any less of a diacrylate reactant increases defects such as seg peel and cracked lenses. Increasing the diacrylate reactant beyond 20 parts provides a coating having an unsatisfactory abrasion resistance.

An important constituent of the coating composition of the present invention is a photoinitiator to provide maximum ultraviolet-initiated crosslinking reaction. A photoinitiator for purposes of the present invention is defined as a compound which can be raised to an excited electronic energy state by the absorption of electromagnetic radiation in the form of ultraviolet or visible light and which, through either intramolecular or intermolecular attraction, can result in the formation of a reactive intermediate. The photoinitiator further initiates polymerization of the acrylate reactants to cause crosslinking therebetween.

In the prior art, many types of photoinitiators have been used to cure coating compositions which are applied to lenses. For example, the Oshima et al U.S. Pat. No. 3,968,305 includes the use of azobisisobutronitrile, benzoyl peroxide, lauroyl peroxide and benzoin and its alkyl ether, the alkyl groups having at most 4 carbon atoms. Although such photoinitiators provide a mechanism for curing the coating composition using ultraviolet radiation, the ultraviolet radiation curing must be performed under an inert environment, or various oxygen scavengers, such as nitrogen-containing compounds, must be used. However, these methods suffer in that the constituents used to minimize oxygen inhibition reduce the effective crosslinked density of the resulting cured film, resulting in a plasticized, weaker and less abrasion-resistant cured film surface. Furthermore, in order for the coating to adhere to the lens material, either the coating is not fully cured, providing functional groups at the interface between the coating and the lens material, such as is described in the Sandvig et al U.S. Pat. No. 4,544,572, or the photoinitiator is of a less efficient type, such as is described in the Oshima et al U.S. Pat. No. 3,968,305 of the Matsuo et al U.S. Pat. No. 3,968,309. However, the use of a less efficient photoinitiator has the disadvantage of providing a less abrasion resistant coating.

The present invention requires the use of highly efficient photoinitiators to cure the coating composition without regard to adherance of the coating composition to the lens material. Suitable photoinitiators include aroketones and aromatic-containing ketones. The preferred photoinitiator of the present invention is 1-hydroxy-cyclohexyl-phenyl ketone, which is employed at concentrations of 0.1–10.0% by weight of the resin solids and most preferably in the range of 2–5% by weight of the resin solids. The preferred photoinitiator is marketed under the designation of IRGACURE 184 by Ciba-Geigy.

The use of a more highly efficient photoinitiator system permits curing of the coating composition without regard to whether the curing takes place in an oxygen environment or in an inert environment.

The ultraviolet source used in the present invention is a commercially-available medium-pressure mercury lamp having its greatest output in the wavelength ragne of 240–270 nm. The wavelength range of 240–270 nm results in an efficient absorption of UV by the preferred photoinitiator of the present invention.

To prevent premature polymerization or gelling of the coating solution before UV exposure, a polymerization inhibitor is provided in the coating composition of the present invention. In addition to providing useful storage and working life to the coating solution, the inhibitor preserves a molecular layer of unreacted acrylate groups on the surface of the coating composition which interfaces with the lens forming material while still permitting UV cure in an oxygen environment to form a highly crosslinked film on the mold. It is believed that the acrylate groups of the coating composition form carbon-to-carbon covalent bonds adhering the coating composition to the lens although the coating composition is "fully cured."

Polymerization inhibitors useful in the present invention include compounds in the unsubstituted and substituted hydroquinone family. A preferred inhibitor is monoethyl ether hydroquinone (MEHQ). Approximately 100 to 2000 parts per million of MEHQ with preferably approximately 350 parts per million of MEHQ results in sufficient functional groups having left active in the interface between the coating and the lens material without effecting complete cure in the remaining portion of the coating and without effecting the abrasion resistance of the coating.

The following theory is proposed as an explanation, without the applicant being bound thereto, as to the mechanism of the formation of the coating composition and its adherance to the lens polymer. When the coating composition is subjected to ultraviolet radiation, the curing of the coating composition is stratified as a function of its distance within the thickness of the coating. Specifically, for any given point within the coating film, the ultraviolet dose will be inversely proportional to the square of the distance, with the highest dose being administered to the surface nearest the ultraviolet source, and the lowest dose received at the interface of the mold surface with intermediate doses in between. Sufficient UV dosage is applied to penetrate through the coating film and provides essentially complete crosslinking of the layer of coating at the coating/mold surface interface. However, the oxygen inhibitor saves a sufficiently large population of acrylate functional groups at the coating/lens polymer interface so that the covalent chemical bonds can be formed between the coating composition and the lens polymer. It is believed that this covalent bonding provides the strong adherance of the curved coating composition to the lens polymer.

A further important constituent of the coating composition of the present invention is a silane compound such as 3-methacryloxypropyltrimethoxysilane sold under the designation of SILANE M-8550 by Petrarch Systems of Bristol, Pa. The silane compound provides greater adhesion of the coating to the glass mold and is especially critical in coating multi-focal lenses. The silane compound reduces the seg peel defect, coating delamination and provides better adhesion of the coating to the mold such that the cast open defect is reduced. Addition of the silane compound has provided production yields unknown before of satisfactory multi-focal lenses. It has been found by the applicants that up to 3% by weight of the reactants of the silane compound provides a satisfactory coating. Using an amount of the silane compound above 3% results in undercoating problems. A preferred amount of the silane compound has been found to be approximately 0.1% by weight of the reactants. Other siloxane compounds equally effective in producing increased adhesion of the coating to the mold and reducing defects include N-(3-acryloxy-2-hydroxypropyl)-3-amino-proyltriethoxysilane, N-2-aminoethyl-3-aminopropyltrimethoxysilane, 3-aminopropyltriethoxysilane, $\beta$-(3,4-epoxycyclohexyl)ethyltrimethoxy)silane, (3-glycidoxypropyl)trimethyoxysilane, 3-methacryloxypropylmethyldiethoxysilane, 3-methacryloxypropyltrimethoxysilane, 3-methacryloxypropyltri(methoxy)silane; 3-methacryloxypropyltri(trimethylsiloxy)silane, and vinyltrimethoxysilane.

To further promote the effectiveness of the silicone compound, it has been found by applicants that an acid, such as acrylic acid, in a range of approximately 0.1% to 0.5% by weight of the reactants with a preferred amount of 0.1% by weight of the reactants, when added, produces a coating composition with a minimal amount of the described defects.

To produce a coating composition having satisfactory flowing properties, that is one that is readily applied to the face of a mold, a highly volatile solvent is added to the coating composition. A preferred solvent is methylene chloride. Other solvents, such as methylethyl ketone are also includable within the scope of the present invention.

The coating composition may also include a surfactant which provides good flow and proper wetting properties of the coating composition when applied to the face of the mold, especially in a flow coating process. A satisfactory surfactant is sold by 3M Company of St. Paul, Minn. under the designation of FC-430. Approximately 0.5% to 5% of surfactant by weight of the reactants has been found to be satisfactory.

It is believed that the acid is necessary to transform the methoxy groups (or ether groups) to the more active hydroxy groups which in turn react and adhere to the glass mold. Acrylic acid appears to polymerize under UV conditions after activating the silane and is no longer a "free acid." Other acids which are suitable include acetic acid and other low molecular weight organic acids, hydrochloric acid, sulfuric acid and other mineral acids.

A UV tracer such as 2,2'(2,5-thiophenediyl)bis(5-tert-butyl benzoxazole) sold under the name UVITEX OB by Ciba-Geigy Corporation is added so that the lens is identifiable from other lenses when placed in the marketplace.

A suitable material for forming the lens is an acryl- or allyl-functional polymer, with the latter being a preferred embodiment for casting ophthalmic lenses (and more preferably allyl diglycol carbonate monomer or prepolymer, such as is commercially available as PPG Industries' CR-39 monomer). At the lens/coating interface, carbon-to-carbon covalent bonds are formed between the lens material and the layer of residual active acrylate groups of the coating material. The bonds that are formed provide secure adherance of the coating to the lens material.

Typically, the coating of the present invention is flowcoated onto the face of a glass lens mold. A sufficient amount is applied to the glass mold such that a coating of 2–3 microns in thickness is produced after curing. Typically, the coating composition of the present invention shrinks approximately 18% after evaporation of the solvent and during curing. The coating is then subjected to ultraviolet light which initiates crosslinking (curing) of the reactants such that a hard abrasion-resistant coating is formed that adheres to the face of the mold.

After the coating has been cured, the mold cavity is formed by connecting the second mold face by a gasket to the first mold face and the lens forming material is introduced into the mold. The lens material is then allowed to harden with bonding of the lens material to the cured coating occurring as described previously above. After the lens material has hardened, the solid coated lens is removed from the mold with the coating strongly adhering to the lens material.

The following example is for illustrative purposes only and is not to be considered as limiting the present invention. Unless otherwise noted, all references to parts are to parts by weight.

EXAMPLE 1

A liquid hard coating general formulation was prepared consisting of:

| (%) | Compound |
|---|---|
| 6.00% | pentaerythritol triacrylate |
| 0.60% | polyethylene glycol diacrylate |
| 1.00% | 1-hydroxycyclohexyl-phenyl ketone |
| 0.10% | 3-methacryloxypropyltrimethoxysilane |
| 0.10% | acrylic acid |
| 0.34% | FC-430 (10% solution in methylene chloride) |
| 0.20% | UVITEX OB (1% solution in methylene chloride) |
| 91.50% | methylene chloride |

The above coating solution was prepared by initially mixing the polyethylene glycol diacrylate, the FC-430 (10% solution) and the UVITEX OB (1% solution). The photoinitiator, the pentaerythritol triacrylate and the immediately above-described mixture were mixed. To this mixture was added 3-methacryloxypropyltrimethoxysilane with acrylic acid. The solvent, methylene chloride, was added and the entire mixture stirred.

This formulation was flowcoated onto clean glass single focal lenses and multi-focal lenses by flow coating. The coated molds were heated by infrared lamps to evaporate the solvent from the molds. The coating was then cured by exposure to a 100 watt UV lamp. The molds were then attached to a gasket and the back molds attached thereto to form a mold cavity. The mold cavities were then filled with a CR-39 lens forming polymer and cured conventionally by circulating through an air oven.

After curing, the coated lenses were removed from the molds.

Over 80% of both single and multi-focal lenses, using the above composition, were found to be free of the defects described previously. Adhesion of the coating, tested by applying a tape to the coating and pulling the tape, was found to be excellent with no defects noted. Abrasion resistance of the coating was essentially the same as coatings made solely of pentaerythritol tetraacrylate.

EXAMPLES 2-5

For comparative purposes, four coating compositions were prepared using the procedure of Example 1. A base composition containing the following components and concentrations was used:

| | |
|---|---|
| 6.5% | polymeric reactants |
| 3.5%* | 1-hydroxycyclohexyl-phenyl ketone |
| 0.525%* | FC-430 |
| 0.03%* | UVITEX OB |

*Percent of polymeric reactants

The polymeric reactants were varied and a silane compound and acid were added as follows:

| Example | 2 | 3 | 4 | 5 |
|---|---|---|---|---|
| A | 100 | 90 | 90 | 90 |
| B | 0 | 10 | 10 | 10 |
| C | 0 | 0 | .1 | .1 |
| D | 0 | 0 | 0 | .1 |
| % of Satisfactory Lenses | 45.7 | 63.9 | 71.4 | 71.8 |
| Cracked Lens Defect (%) | 7.1 | 9.7 | 8.5 | 8.5 |
| Seg Peel Defect (%) | 15.7 | 6.9 | 7.1 | 12.7 |
| Total Delamination Defect (%) | 31.4 | 19.4 | 12.9 | 7 |
| Adhesion After Dyeing | Unsatisfactory | Unsatisfactory | Unsatisfactory | Satisfactory |
| Dye Results | Okay | Okay | Okay | Okay |
| Abrasion Resistance | Standard | Standard | Standard | Standard |

A = pentaerythritol tetracrylate
B = polyethylene glycol diacrylate
C = 3-methyacryloxy-propyltrimethoxysilane
D = acrylic acid.

Concentrations in the above table of A and B are relative concentrations as to each other. The concentration of C and D is a percentage based on the weight of A and B.

From the above table, it is clearly seen that the usage of pentaerythritol tetracrylate alone, without a diacrylate monomer and an adhesion silane promoter and acrylic acid produces a very low yield of lenses. Addition of the diacrylate monomer produces a dramatic increase in the yield of satisfactory lenses without losing abrasion resistance. The addition of the saline adhesion promoter further increases the yield of satisfactory lenses without loss of abrasion resistance.

Satisfactory adhesion of the coating is achieved when acrylic acid is added.

Standard abrasion resistance is defined as the level of abrasion resistance provided by pentaerythritol tetracrylate alone. No substantial difference was discernable between the abrasion resistance of the coating of the present invention and a coating containing only pentaerythritol tetracrylate.

Although the present invention has been described with reference to preferred embodiments, workers skilled in the art will recognize that changes may be made in form and detail without departing from the spirit and scope of the invention.

What is claimed is:

1. A process for producing a coated ophthalmic lens, the processing comprising:
    applying a coating composition in a solvent to a face of a mold, the coating composition including polymeric reactants, 70% to 95% of which have at least triacrylate functionality and 5% to 30% of which have diacrylate functionality, a photoinitiator, a polymerization inhibitor reactive with oxygen and in an amount insufficient to affect substantial curing of the coating composition and in an amount insufficient to substantially affect abrasion resistance of the coating, a silane adhesion promoter and an acid;
    subjecting the coating composition to an initial single dose of ultraviolet radiation in an oxygen environment sufficient to substantially polymerize the reactants so that the coating is in a hard abrasion-resistant state;
    filling the lens mold with the lens-forming material;
    permitting the lens forming material to harden; and removing the hardened lens with the coating attached thereto from the mold.

2. The process of claim 1 wherein the photoinitiator is selected from the group consisting of aroketones and aromatic-containing ketones.

3. The process of claim 2 wherein the photoinitiator includes 1-hydroxycyclohexyl-phenyl ketone.

4. The process of claim 1 wherein the polymerization inhibitor is selected from the group consisting of unsubstituted and substituted hydroquinones.

5. The process of claim 4 wherein the polymerization inhibitor is monoethyl ether hydroquinone.

6. The process of claim 1 wherein the coating composition further includes methylene chloride solvent.

7. The process of claim 1 wherein the silane compound is 3-methacryloxypropyltrimethoxysilane.

8. The process of claim 7 wherein the concentration of 3-methacryloxypropyltrimethoxysilane is up to 3% by weight of the polymeric reactants.

9. The process of claim 8 wherein the concentration of 3-methacryloxypropyltrimethoxysilane is approximately 0.1% by weight of the polymeric reactants.

10. The process of claim 1 wherein the coating composition includes acrylic acid.

11. The process of claim 10 wherein the concentration of acrylic acid is up to 0.5% by weight of the polymeric reactants.

12. The process of claim 11 wherein the concentration of acrylic acid is approximately 0.1% by weight of the polymeric reactants.

13. The process of claim 1 wherein the triacrylate functional reactant is pentaerythritol triacrylate prepolymer.

14. The process of claim 13 wherein the diacrylate functional reactant is polyethylene glycol diacrylate prepolymer.

15. The process of claim 14 wherein the ratio of pentaerythritol triacrylate prepolymer to polyethylene glycol diacrylate prepolymer is approximately 9:1.

16. The process of claim 1 wherein the lens forming material is an allyl-functional prepolymer.

17. The process of claim 16 wherein the allyl-functional prepolymer is allyldiglycolcarbonate prepolymer.

* * * * *